(12) United States Patent
Evans

(10) Patent No.: US 7,895,526 B2
(45) Date of Patent: Feb. 22, 2011

(54) USER INTERFACE DESIGN FOR ENABLING NON-SEQUENTIAL NAVIGATION, PREVIEW AND REVIEW OF BRANCHING AND LOOPING WIZARDS

(75) Inventor: Andrea L. Evans, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 502 days.

(21) Appl. No.: 11/696,055

(22) Filed: Apr. 3, 2007

(65) Prior Publication Data

US 2008/0250317 A1  Oct. 9, 2008

(51) Int. Cl.
*G06F 13/00* (2006.01)
*G06F 15/00* (2006.01)
(52) U.S. Cl. ................................ 715/762; 715/765
(58) Field of Classification Search .......... 715/711–715, 715/763–765, 851–855, 740–744, 780
See application file for complete search history.

(56) References Cited

U.S. PATENT DOCUMENTS

2003/0048300 A1* 3/2003 Li ............................ 345/762
2003/0081002 A1* 5/2003 De Vorchik et al. ......... 345/762

* cited by examiner

*Primary Examiner*—Cao (Kevin) Nguyen
(74) *Attorney, Agent, or Firm*—Kilpatrick Townsend & Stockton LLP

(57) ABSTRACT

The present invention generally relates to systems and methods for providing improved wizard navigation. A roadmap for the wizard is provided that enables non-sequential navigation through the wizard. Wizard steps that are not enabled for user interaction may be available for viewing by the user in a disabled mode, in which the user controls are deactivated and explanatory text may be added. The roadmap may also be dynamically updated according to user interaction with the wizard. Branches or loops of the wizard may be indicated in the roadmap to guide the user as to the structure of the wizard. In response to the user input, the roadmap may be instantly updated to reflect the revised structure of the wizard after the user input. User input may also be used to update a title of a roadmap stop. Enabled/disabled or visited/unvisited status of the roadmap stops may also be indicated.

23 Claims, 17 Drawing Sheets

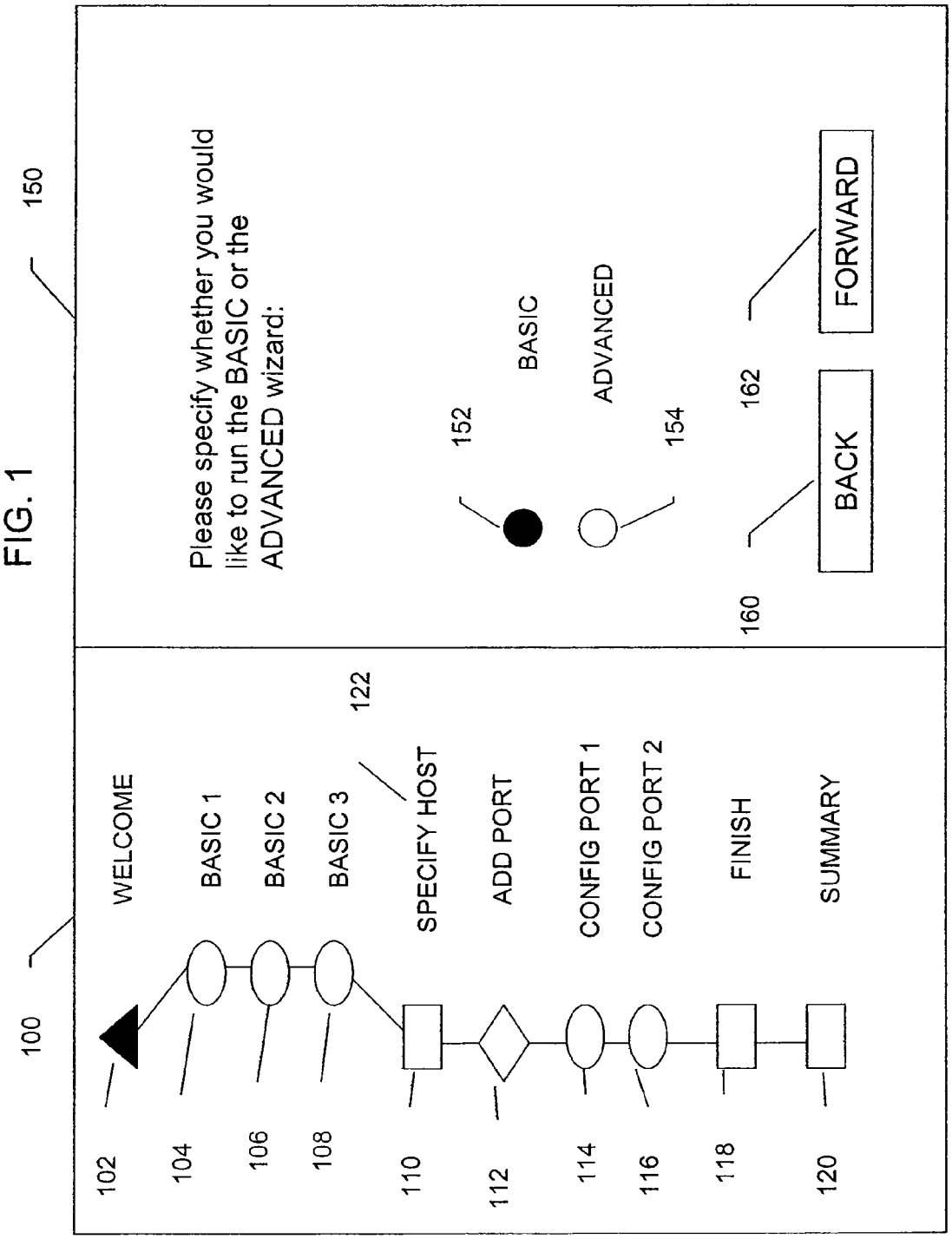

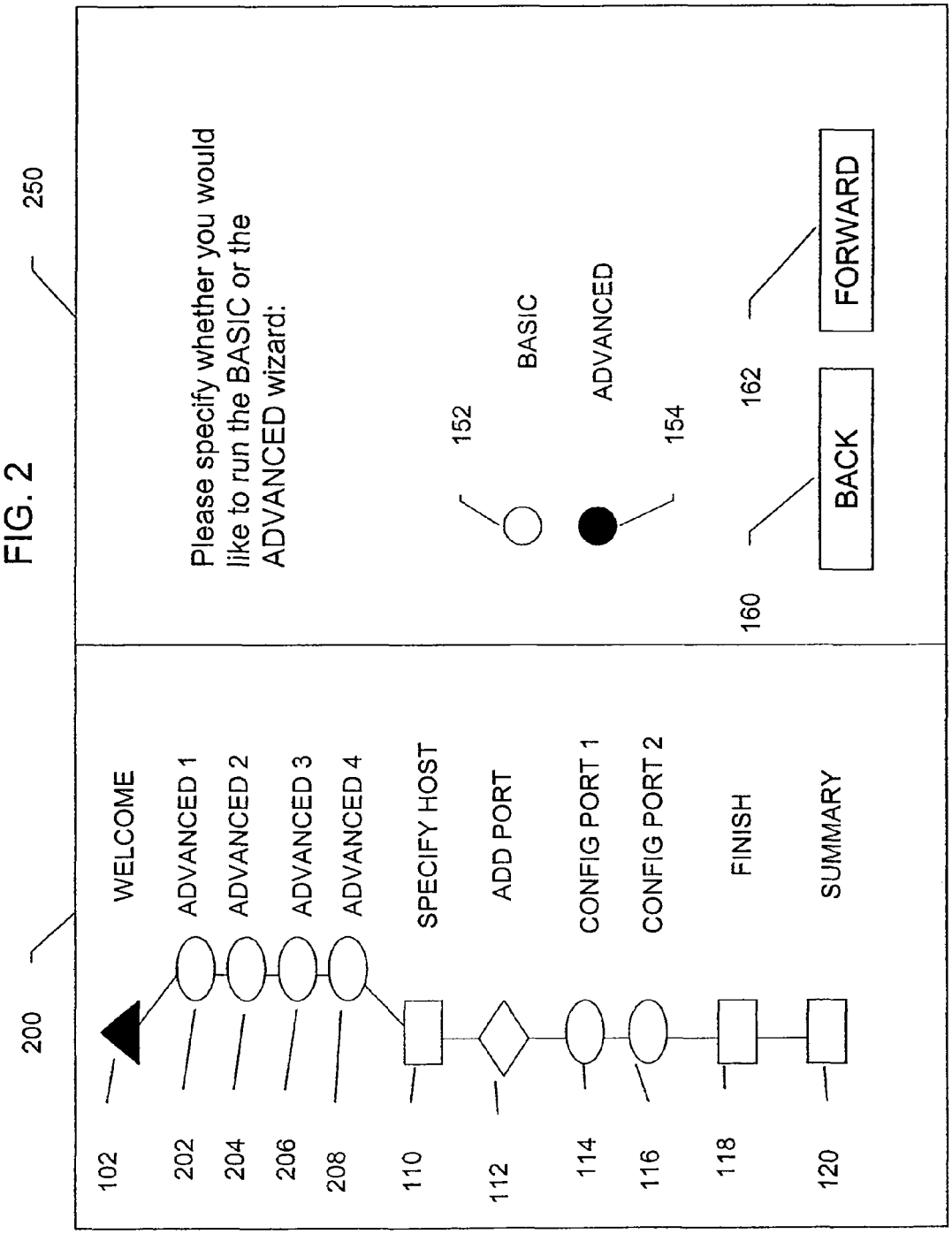

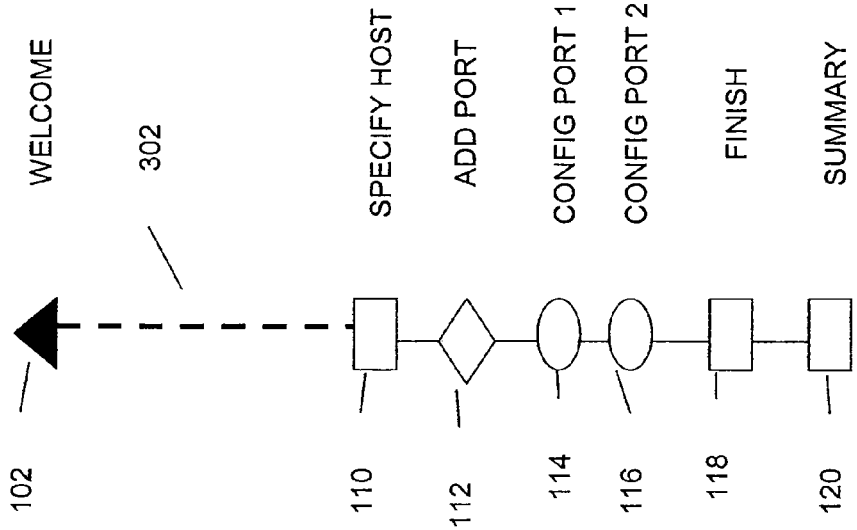

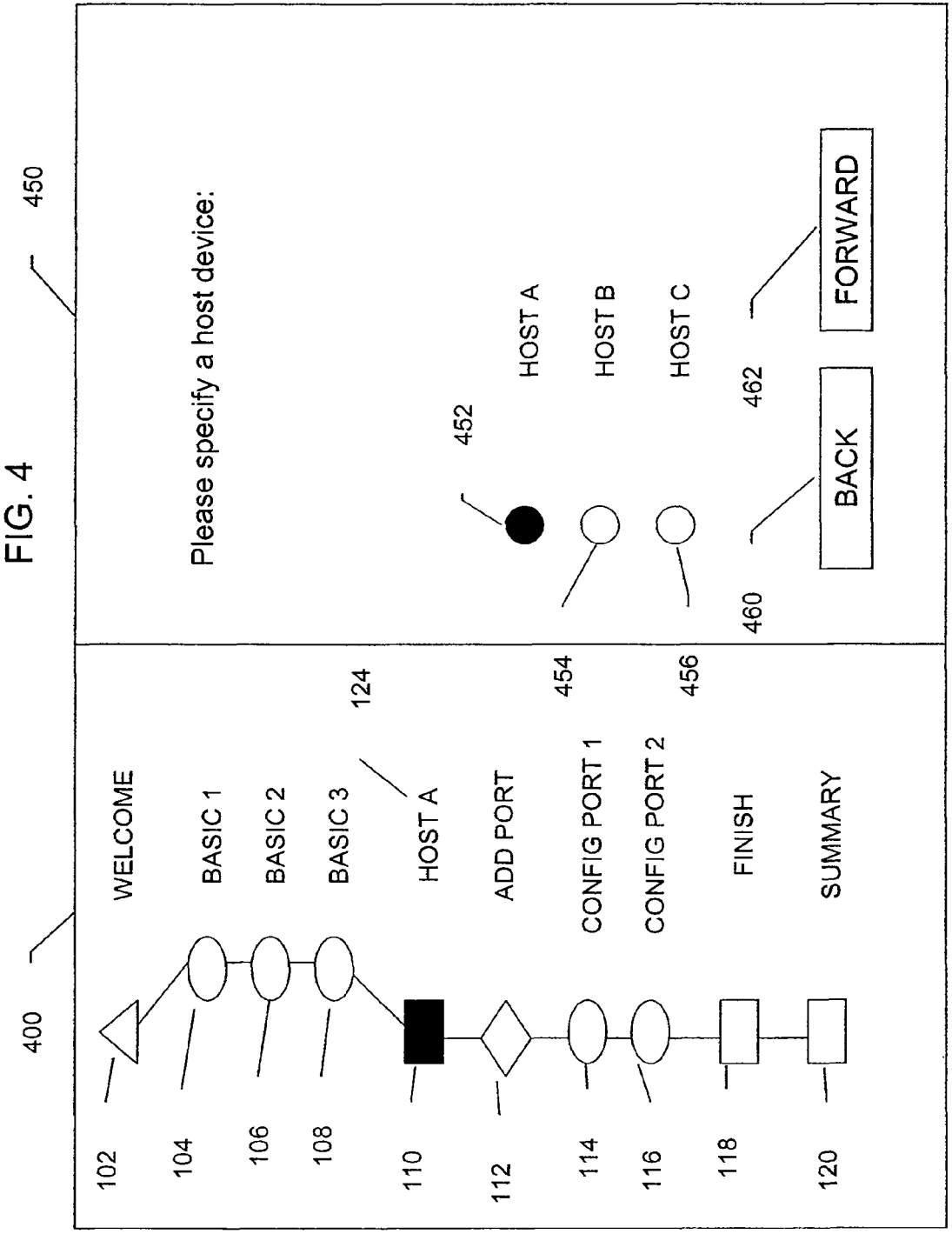

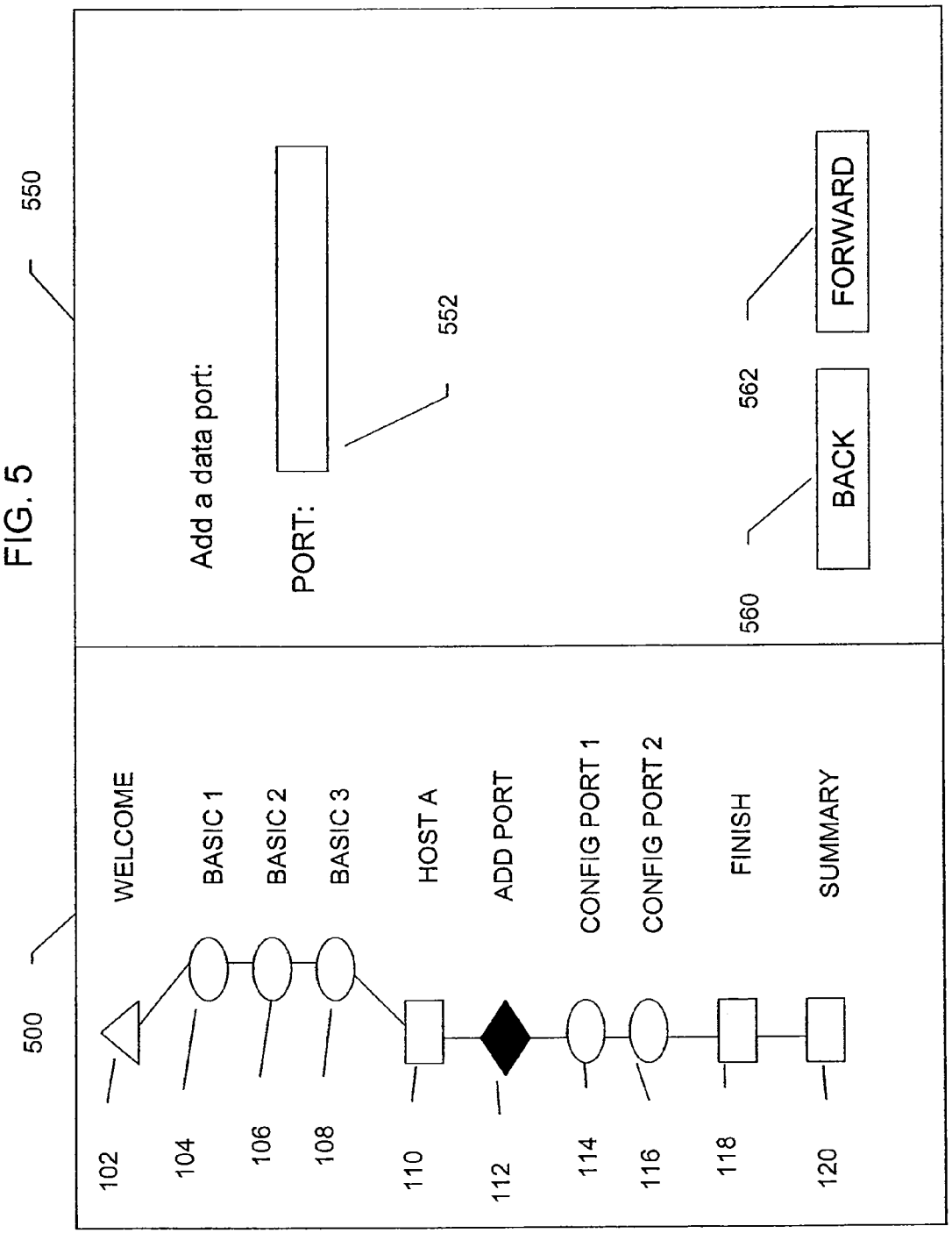

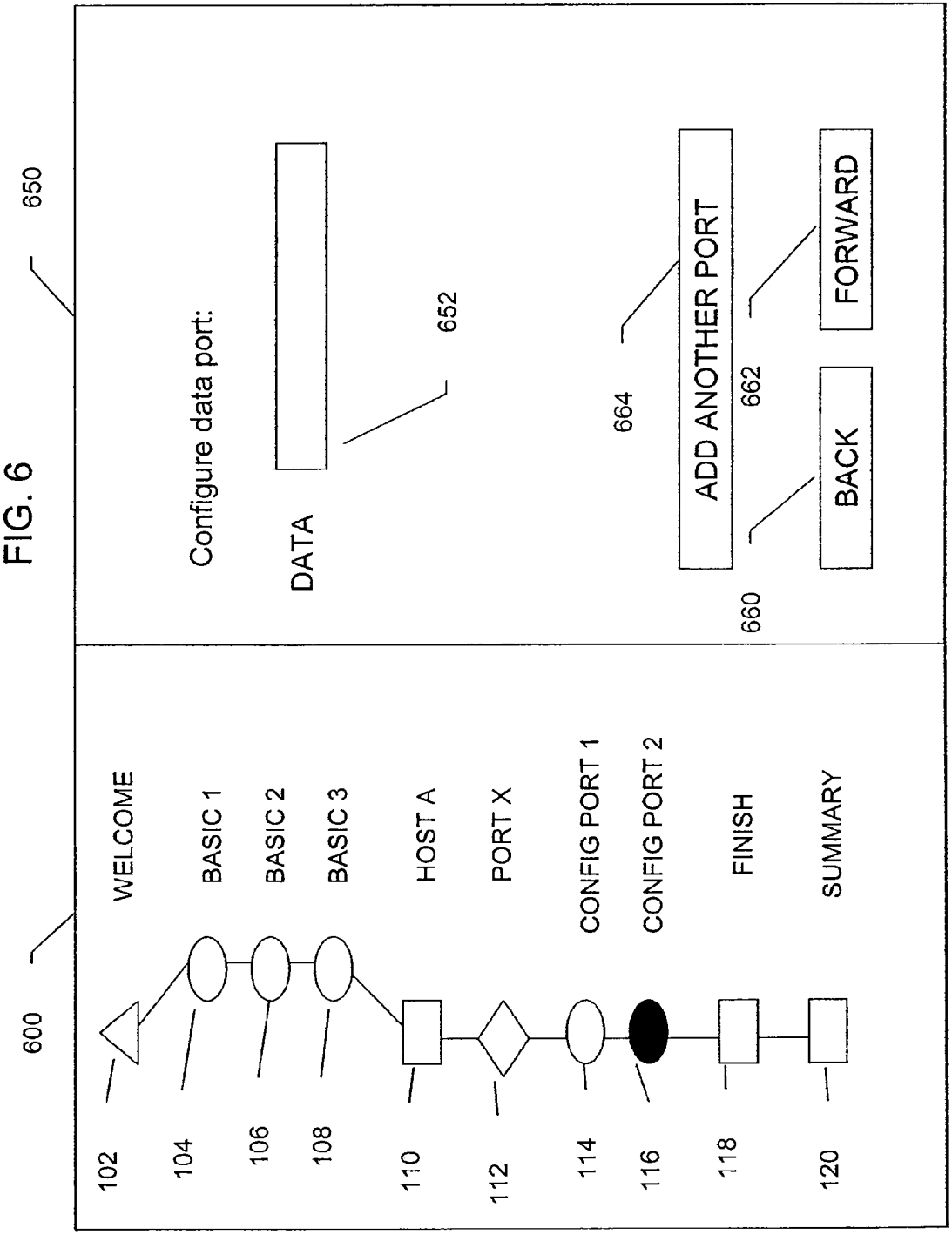

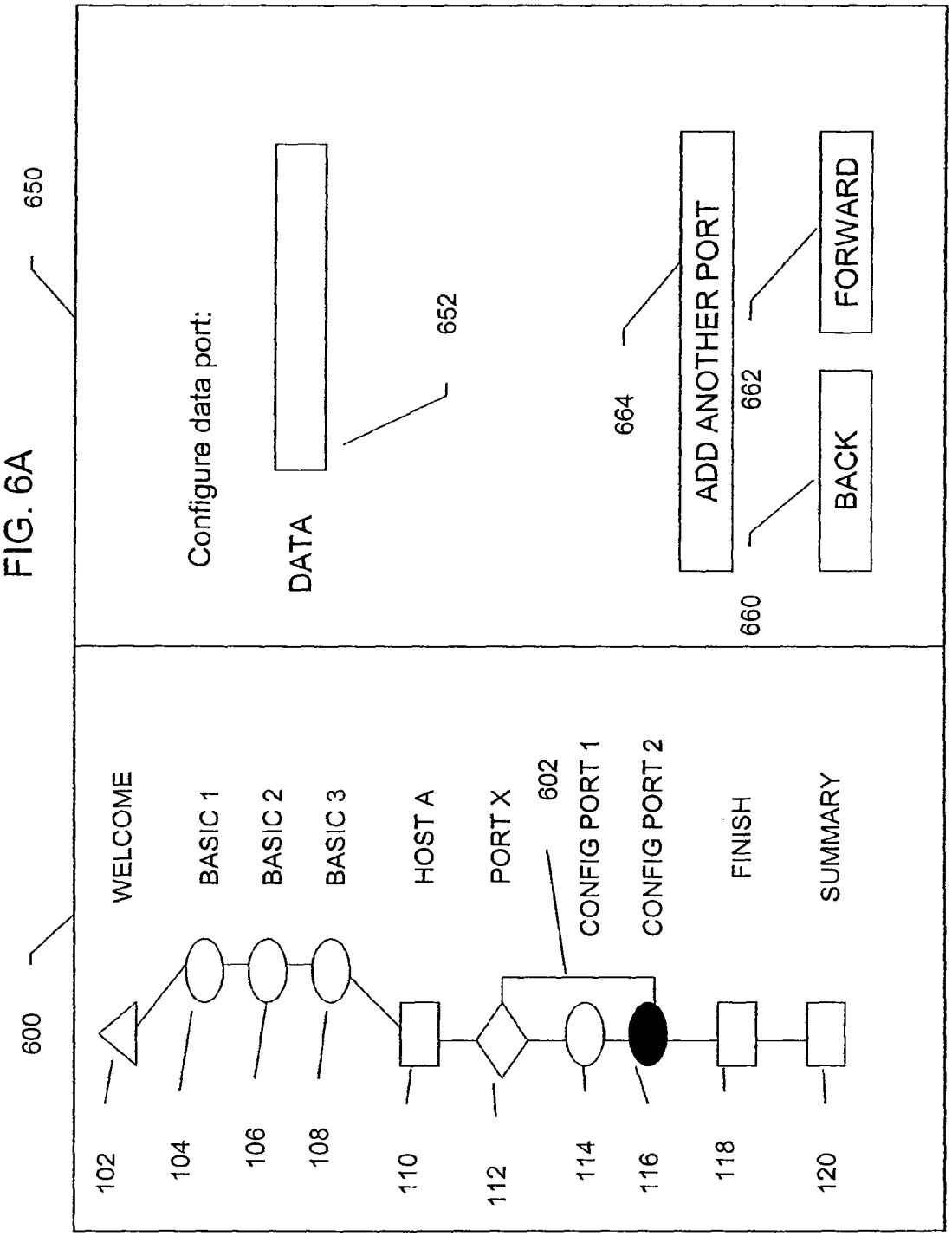

USER INTERFACE DESIGN FOR ENABLING NON-SEQUENTIAL NAVIGATION, PREVIEW AND REVIEW OF BRANCHING AND LOOPING WIZARDS

BACKGROUND OF THE INVENTION

Embodiments of the present invention relate to user interface programs commonly known as "wizards," such as may be provided to help a user install or configure software programs.

Wizards are a standard user interface convention in all facets of computing, and are especially common in helping users accomplish complicated installation and configuration tasks. Wizards are a means of gathering input from the user at each step in a multi-step process, essentially by presenting the user with a series of screens that request the information. Wizards also guide the user through the configuration or installation routine in a relatively fail-proof manner, so that the user does not control the sequence of steps, and therefore eliminate the possibility of user error. Wizards are most commonly used to guide a user through a complex process or to guide novice users.

One problem with the usability of wizards has been the fact that it is often difficult for the user to understand where in the wizard (i.e., at what step in the wizard) the user is currently located. This lack of "sense of place" within the wizard may be exacerbated (1) when the wizard is unfamiliar to the user, so that the user cannot tell how many steps are ahead and what he will have to do at each of these future steps, (2) when the wizard contains many steps, so that that the user forgets how many steps has already been completed or what input was provided in each of those previous steps, (3) when the wizard contains branches (i.e., the number or nature of the steps the user must complete in future is altered depending on the user's input in previous steps), and (4) when the wizard contains loops (i.e., the user may cycle through a subset of steps in the wizard multiple times).

A second long-standing problem with the usability of wizards involves a situation where some steps in the wizard do not apply to the user. The user will naturally wish to save time by skipping over those irrelevant steps and navigating immediately to those steps which are relevant to the user. Commonly, there is no solution to this second usability problem (i.e., the inability to skip immediately over irrelevant steps). Instead, the user has been forced to waste time by going through all of the irrelevant steps, because the most common navigational mechanism within wizards has been a strictly sequential navigation mechanism which only permits the user to navigate to the steps immediately before or after the current step.

BRIEF SUMMARY OF THE INVENTION

Embodiments in accordance with the present invention generally relate to systems and methods for providing improved wizard navigation. In embodiments of the present invention, a roadmap for the wizard is provided that enables non-linear or non-sequential navigation through the wizard steps. The user may interact with the stops on the roadmap to view any screen in the wizard. Moreover, wizard steps that are not enabled (e.g., because the user has yet to enter required information in a previous step or because the installation/configuration has already been completed) may be available for viewing by the user in a disabled mode in which the user controls are deactivated. Explanatory text may be provided in the disabled screens to explain information that will need to be entered by the user (when the disabled screen is a future step) or to explain information that was entered to process the completed wizard task (when the disabled screen reviews a previous step).

Embodiments of the present invention may also provide a dynamically updated roadmap in which the roadmap may be constantly repopulated according to user interaction with the wizard. In one aspect, branches or loops of the wizard may be indicated in the roadmap to provide the user with a guide to the structure of the wizard, and in response to the user input at the branching or looping stops, the roadmap may be instantly updated to reflect the user input (e.g., selection of a branch or termination of a loop). In another aspect, user input may be used to update a title of a roadmap stop at which the user input was made. Moreover, the wizard may also be updated to reflect an enabled/disabled or visited/unvisited status of the roadmap stops. In combination, aspects of the present invention enable the roadmap to provide a current record of the steps taken by the user within the wizard and the information entered at those steps.

A further understanding of the nature and the advantages of the inventions disclosed herein may be realized by reference of the remaining portions of the specification and the attached drawings.

BRIEF DESCRIPTION OF THE DRAWINGS

Various embodiments in accordance with the present invention will be described with reference to the drawings, in which:

FIG. 1 illustrates a wizard screen in accordance with an embodiment of the present invention in which the roadmap reflects a BASIC wizard.

FIG. 2 illustrates a wizard screen in accordance with an embodiment of the present invention in which the roadmap reflects an ADVANCED wizard.

FIG. 3 illustrates a wizard screen in accordance with an embodiment of the present invention in which the roadmap is broken to reflect unknown roadmap stops.

FIG. 4 illustrates a wizard screen in accordance with an embodiment of the present invention in which the title of the roadmap stop is revised to reflect user input.

FIG. 5 illustrates a wizard screen in accordance with an embodiment of the present invention in which the roadmap shows that the user is at a looping stop.

FIG. 6 illustrates a wizard screen in accordance with an embodiment of the present invention in which the user is prompted to begin another loop in the wizard.

FIG. 6A illustrates a wizard screen in accordance with an embodiment of the present invention in which the stops encompassed by the loop is indicated.

DETAILED DESCRIPTION OF THE INVENTION

Figure 7:
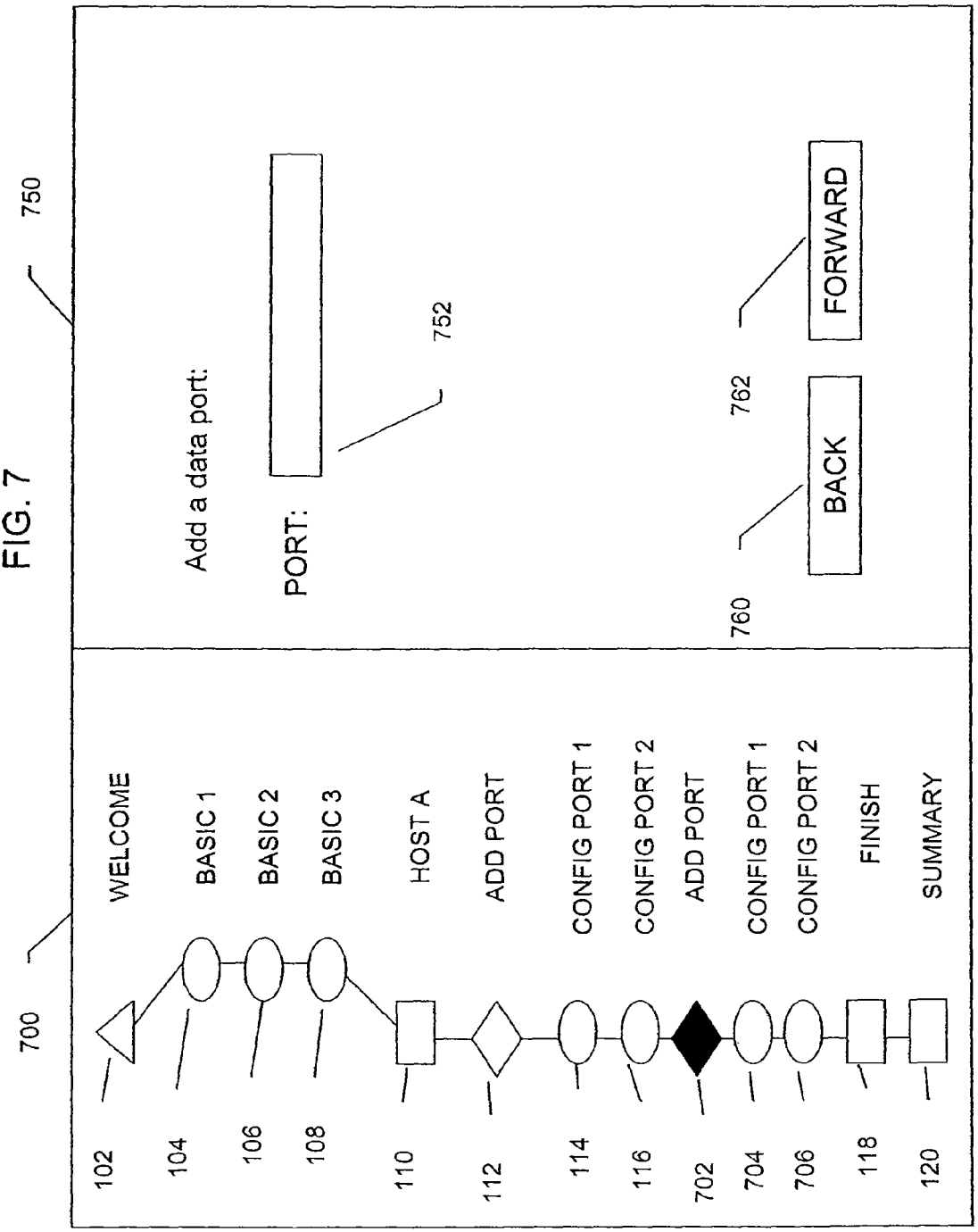
FIG. 7 illustrates a wizard screen in accordance with an embodiment of the present invention in which the roadmap reflects the addition of a second loop in the wizard.

FIG. 1 shows a wizard program interface in accordance with an exemplary embodiment of the present invention. The display may include a roadmap 100 and data entry screen 150. The roadmap serves as a guide to the wizard program and enables the user to orient the user's current position in the wizard and quickly peruse any information or decisions that have already been entered in past steps of the wizard or that are required in future steps of the wizard along the current path. In order to map the user's progress in the wizard, the steps of the wizard (e.g., which may be manifested as display screens of the wizard) may be organized into a plurality of stops on the roadmap. Generally, a wizard includes a number of steps (or screens) that require the user to enter information or to make decisions before moving on to the next step of the wizard. In one approach, the roadmap may be organized so as to provide a one to one matching between roadmap stops and wizard steps (e.g., such that each stop corresponds to a single display screen in the sequence of the wizard). In another approach, multiple steps in the wizard may be organized into a single roadmap stop.

As shown in FIG. 1, roadmap 100 includes a number of roadmap stops (102/104/106/108/110/112/114/116/118/120) that each represent one or more steps of the wizard program. There are a number of different types of roadmap stops, in particular, simple, branching, looping, and common stops. Branching stops represent those steps in the wizard where, based on the user's input in the data entry screen, the wizard will call one of a plurality of different program sequences (i.e., the roadmap will branch). Simple stops represent those steps in the wizard where the user may input data into the wizard, but the wizard does not change in structure based on the user input. Common stops are those stops in the roadmap that are common to all paths through the wizard, regardless of user input. Looping stops are those stops in the roadmap where the wizard steps loop back upon themselves until the user terminates the loop with an input. It should be understood that each roadmap stop may possess more than one of these characteristics. For example, a roadmap stop may be a common branching stop, which is a stop common to the roadmap regardless of any user input, and which branches the roadmap based on the user's input at the stop. Detailed characteristics of each type of roadmap stop will be further illustrated in the following.

FIG. 1 illustrates a interface screen for an exemplary wizard at a common and branching "WELCOME" stop 102, which may be displayed to the user when, for example, the user first initiates the wizard to install a software program or configure existing software. As shown in FIG. 1, the roadmap 100 may indicate the user's current position in the wizard by, for example, filling in the roadmap stop indicator corresponding to the current stop. It should be understood that a number of different methods may be used to indicate status of a roadmap stop, such as altering the appearance of its title or the stop indicator. Referring to FIG. 1, stop 102 may correspond to data entry screen 150 of the wizard, which requests that the user select a "BASIC" or "ADVANCED" wizard program. Generally, a basic wizard program contains fewer options and may be preferable for a novice user, or for a situation where a basic installation or configuration will suffice. The basic wizard program may not allow the user to access some of the more complex options and capabilities that are accessible through the advanced wizard program. Radio buttons 152 and 154 may be provided in data entry screen 150 that allow the user to choose between the basic and advanced wizards. In one approach illustrated by FIG. 1, a default choice may be automatically entered by the wizard before any choice is made by the user (i.e., when the screen 150 is first displayed to the user). In this example, the basic wizard is the default choice selected.

In the approach illustrated by FIG. 1, the roadmap 100 may be entirely pre-populated to display a path of steps based on the default choice of a basic wizard (and any other default choices required to populate the roadmap to the end). In this approach, every step from the beginning of the wizard to the end of the wizard along this path may be shown in the roadmap 100 at all times, regardless of where the user is currently located in the wizard. In this manner, the user may better orient himself in the wizard with respect to its beginning and end. As illustrated by FIG. 2, the user may change from the default choice of a basic wizard on screen 250 by selecting advanced wizard radio button 154. In response to this user selection, the wizard may automatically re-populate the entire roadmap, or at least a portion thereof, based on the new selection. As shown in FIG. 2, the advanced wizard roadmap may, for example, include advanced stops 1-4 (202/204/206/208) which differ from basic stops 1-3 (104/106/108), and which may prompt the user for more detailed information to enable the additional features of the advanced wizard. It should be understood that the reference numerals are carried through between figures for purposes of explanation and should not be interpreted as limitations on the various embodiments.

In an alternative approach, no default choice may be automatically utilized by the wizard, and the roadmap may only outline the wizard steps up to the next branching stop (i.e., decision point) in the roadmap and continue at the next known stop. FIG. 3 illustrates this approach, whereby broken line 302 may be used to indicate the unknown portion of the roadmap 300 before the user has made a choice on screen 350 of whether to proceed with the basic or advanced wizard path. The roadmap 300, therefore, breaks after the branching stop 102 and continues at the next known stop 110, which is a common stop of the roadmap. Once the user makes a choice in screen 350 (i.e., by selecting basic button 152 as shown in FIG. 1, or by selecting advanced button 154 as shown in FIG. 2), the roadmap 300 may then populate the broken line region 302 with roadmap stops based on the user's selection (i.e., by providing a roadmap like that of FIG. 1 or 2).

Thus, the roadmap 100 is a dynamic roadmap that instantaneously updates based on the user's input in the wizard. In another aspect of the dynamic roadmap, the titles corresponding to each roadmap stop may be updated to reflect user input. For example, as shown in FIG. 1, wizard stop 110 may initially have the title 122 "SELECT HOST" before the user has reached that stop to select the desired host. However, as illustrated in FIG. 4, once the user reaches stop 110 in the wizard and selects a desired host in the corresponding data entry screen 450 (e.g., by selecting radial button 452), the title of stop 110 in the roadmap 400 may be changed to title 124 "HOST A." In this manner, the user is not only oriented with respect to his current place in the wizard, but is also able to quickly glean pertinent information that has already been provided to the wizard.

In another aspect of the dynamic roadmap, looping stops may be provided in the roadmap to represent a series of wizard screens that loop back on itself. FIG. 5 illustrates the wizard display when the user has navigated to looping stop 112, which begins a series of wizard screens for adding and configuring a communication port. As shown in FIG. 5, the user may enter the name of a port to be added in data entry prompt 552 (e.g., port XYZ). Further simple stops 114 and 116 may be encompassed by looping stop 112, and may enable the user to enter further data for configuring the port. As shown in FIG. 6, once the user arrives at the last simple stop 116 encompassed by the loop of stop 112, the user may be prompted in screen 650 to either add another port by selecting button 664, or to proceed past the looping stop 112 in the wizard by selecting forward button 662. As illustrated by FIG. 7, if the user elects to add another port in screen 650, another looping stop 702 will be created in the roadmap 700 along with simple stops 704 and 706, which are encompassed by looping stop 702. Additional looping stops may continue to be created until the user elects to proceed past the looping stop in the wizard.

It should be understood that the foregoing is only one example of how to execute looping stops in the dynamic roadmap and that other methods may also be used. For example, add port button 664 may not be provided in screen 650 and further looping stops may be automatically generated by the wizard when the user selects the forward button 662. In that approach, new looping stop 702 (and accompanying simple stops 704 and 706) of FIG. 7 will be automatically generated in the roadmap at first, but may be later deleted if the user elects to proceed in the wizard without adding a new port (e.g., by selecting forward button 762 on screen 750 without entering the name of a new port to be added). Also, a looping stop need not encompass additional simple stops. For example, looping stop 112 may be a single stop (which may represent a single screen or multiple screens of the wizard) that loops back upon itself.

In one aspect of the present invention, the location of branches or loops in the wizard are indicated in the roadmap to provide the user with a structure of the wizard. For example, as shown in FIG. 1, roadmap stops 104, 106, and 108 may be indicated as a branch in the wizard by displaying those stops in the roadmap with an offset. Roadmap stops that are encompassed by looping stops may also be offset in this manner, or may be indicated by other means, such as loop 602 of FIG. 6A, or both. In another aspect of the present invention, roadmap stops may be represented using different symbols, icons, or images based on a functional characteristic of the stop. For example, as shown in FIG. 1, a branching stop like stop 102 may be represented by a triangle, a simple stop like stops 104, 106, and 108 may be represented by a circle, a looping stop like stop 112 may be represented by a diamond, and a common stop (that is not a branching or looping stop) like stops 118 and 120 may be represented by a rectangle. In this manner, the roadmap may graphically inform the user of its structure and of the functional characteristics of each stop.

In another aspect, a roadmap can enable non-linear navigation of the wizard steps (or screens). One general usability issue with wizards is its rigidly linear nature, in which the user is provided with only the most rudimentary navigation tools like the forward button and the back button, and in which the user may not navigate past a screen until the relevant information has been entered. The present invention enables the user to non-linearly or non-sequentially navigate, forward or backward, to any wizard screen using an interactive roadmap, and need not require the user to enter all the necessary information in a prior screen before enabling a preview of a later screen in which the controls may be, at least partially, deactivated. Similarly, even after the wizard task has been completed, whether entirely or in part, the user is allowed to navigate immediately to any past screens to review the information that was entered.

Figure 8:
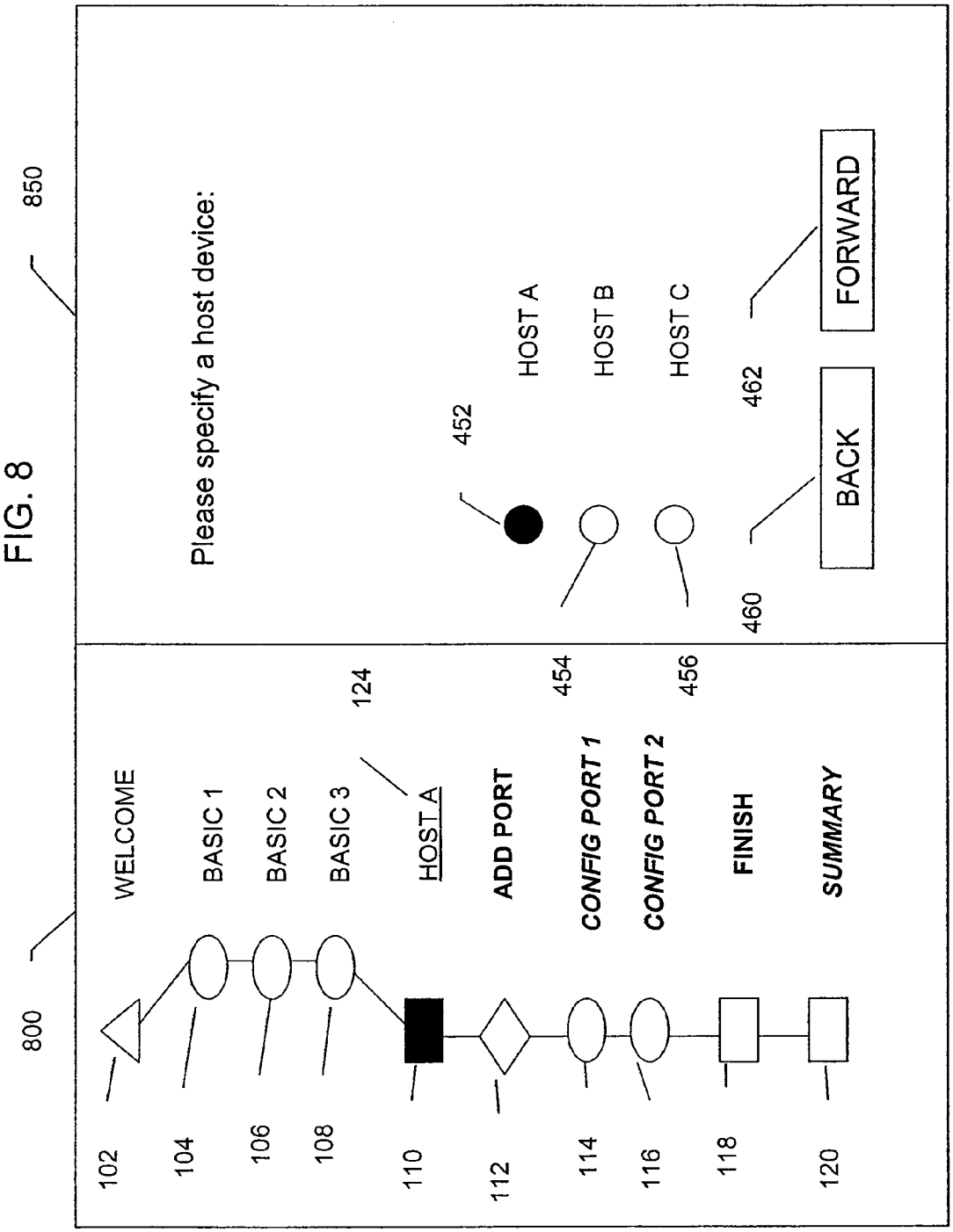
FIG. 8 illustrates a wizard screen in accordance with an embodiment of the present invention in which the roadmap reflects the status of roadmap stops.
Figure 9:
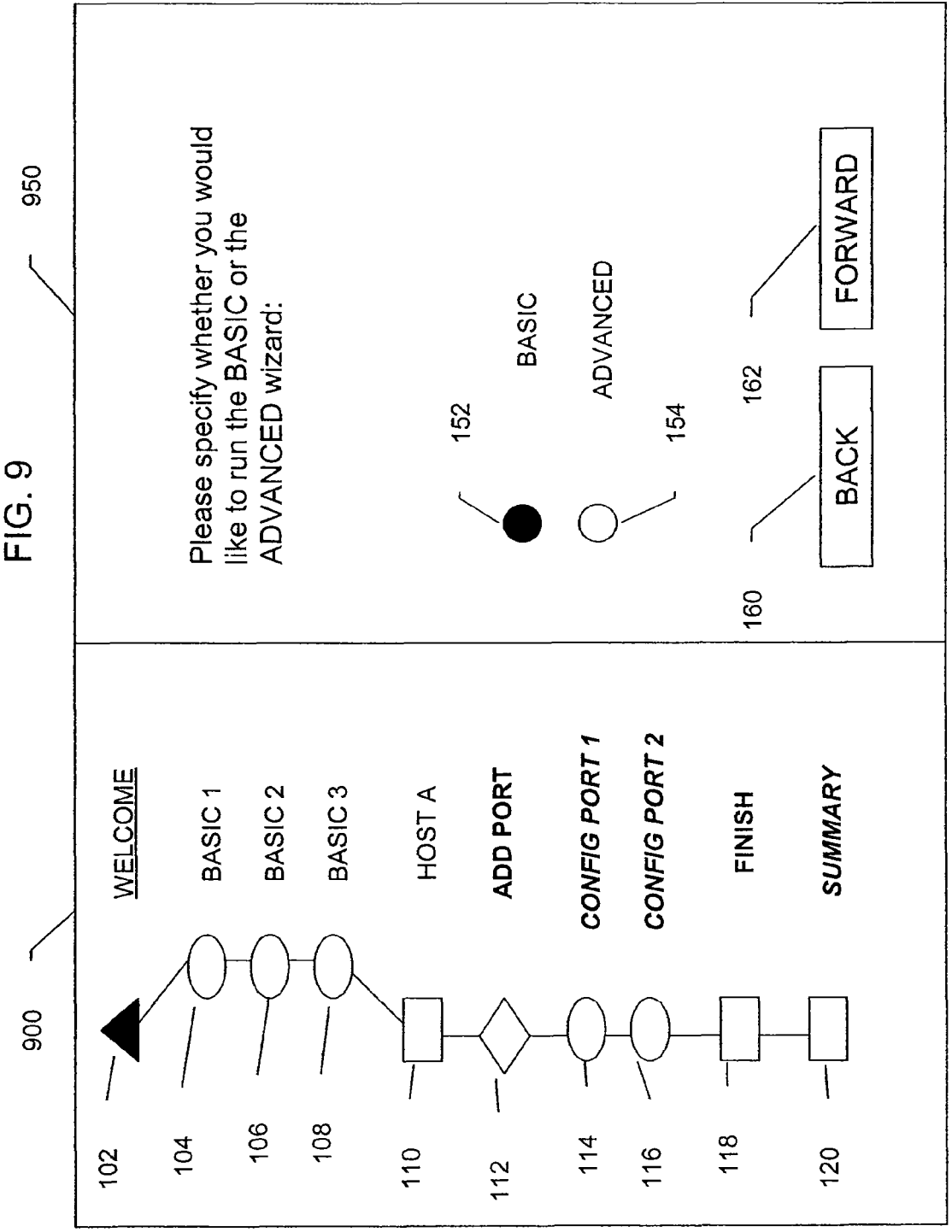
FIG. 9 illustrates a wizard screen in accordance with an embodiment of the present invention in which the roadmap reflects the status of roadmap stops.
Figure 10:
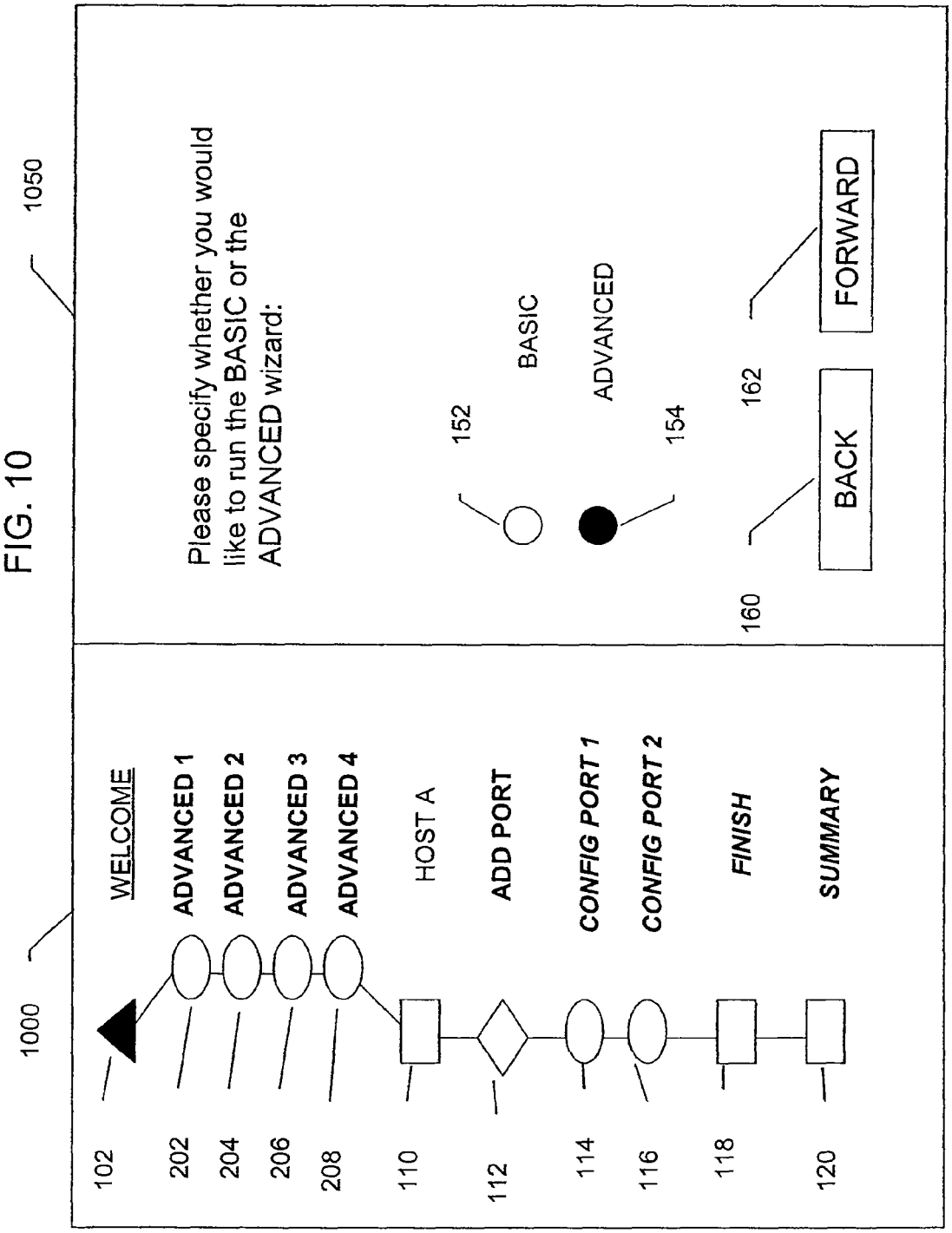
FIG. 10 illustrates a wizard screen in accordance with an embodiment of the present invention in which the roadmap reflects the status of roadmap stops.

FIG. 8 illustrates the wizard display when the user is located at roadmap stop 110. In this snapshot state of the wizard, there are a number of fully functional roadmap stops at which the user has full ability to interact with the corresponding wizard screens (e.g., to make selections or enter data). A roadmap stop at which the user may fully interact with the corresponding wizard screen (i.e., has full use of its controls and data entry prompts) may also be referred to as an enabled stop. As shown in FIG. 8, stops 102, 104, 106, and 108 are enabled stops that the user has already visited in the wizard. These stops may be indicated as visited and enabled stops, here for example, by displaying their titles in normal text. The distinction between visited and unvisited stops, such as stops 112, 114, 116, 118, and 120 may be indicated by displaying their titles in a visibly different style of text: for example, bold, italic or differently colored text. The user may navigate to a visited enabled stop by, for example, selecting the desired stop using a cursor on the screen. For example, as shown in FIG. 9, should the user in FIG. 8 select stop 102, the user will be taken back to a wizard display 950 similar to that of FIG. 1. However, the roadmap 900 of FIG. 9 differs from roadmap 100 of FIG. 1 in that it shows information entered in the wizard subsequent to step 102 (e.g., entry of HOST A as the desired host), and in that roadmap 900 has been updated with information showing that stops 104, 106, 108, and 110 have been visited by the user (e.g., by changing the bolded title text to normal text). However, the user has the same capability in screen 950 as in screen 150 to make selections or enter data. Any change made in screen 950 will be correspondingly reflected in the roadmap. For example, if the user of FIG. 9 changes the selection in screen 950 to radial button 154, the roadmap may be automatically repopulated to reflect the change in the selected roadmap branch, and in the visit status of the newly populated advanced branch stops. For example, as shown in FIG. 10, the newly populated advanced setup stops 202, 204, 206, and 208 would be indicated in the roadmap as unvisited and enabled stops. In some instances, where previously supplied information may be useful, for example, where information provided in basic steps 104/106/108 overlap with information needed for advanced steps 202/204/206/208, the information may be automatically populated in the advanced setup screens.

Returning to FIG. 8, stops 112 and 118 in roadmap 800 are enabled stops that have yet to be visited by the user. It should be noted that some future stops (i.e., stops representing steps that are later or subsequent in the sequence of the wizard) such as FINISH stop 118 are enabled for user interaction even though they skip past intervening stops that have not been visited (and/or at which the user has not provided the required information). That is the case where the wizard can successfully proceed past the intervening unvisited stops. For example, and with reference to FIG. 8, the wizard may successfully proceed past unvisited "ADD PORT" stop 112 to "FINISH" stop 118 because a default port may be automatically used by the wizard when no ports are manually added by the user. Therefore, the present invention enables the user to identify stops that can be skipped and to proceed directly to interact with the next required step in the wizard.

Conversely, some future stops in the roadmap are disabled because the wizard cannot successfully proceed past the intervening unvisited stops (i.e., because the wizard does not yet have the required user input from those unvisited stops). For example, "SUMMARY" stop 120 may not be enabled because the user has not yet visited "FINISH" stop 118, at which final user input is required to proceed with the installation or reconfiguration. Similarly, "CONFIGURE PORT" stops 114 and 116, which are embraced by the looping stop 112, are also disabled because the user has yet to visit "ADD PORT" stop 112 to enter the name of a port. The distinction between enabled and disabled stops may be indicated, for example, by displaying the title text corresponding to those stops in a visibly distinct manner: for example, bold, italic or differently colored text. A disabled future stop may still be visited in preview form by the user, but does not allow the user to fully interact with its controls.

Figure 11:
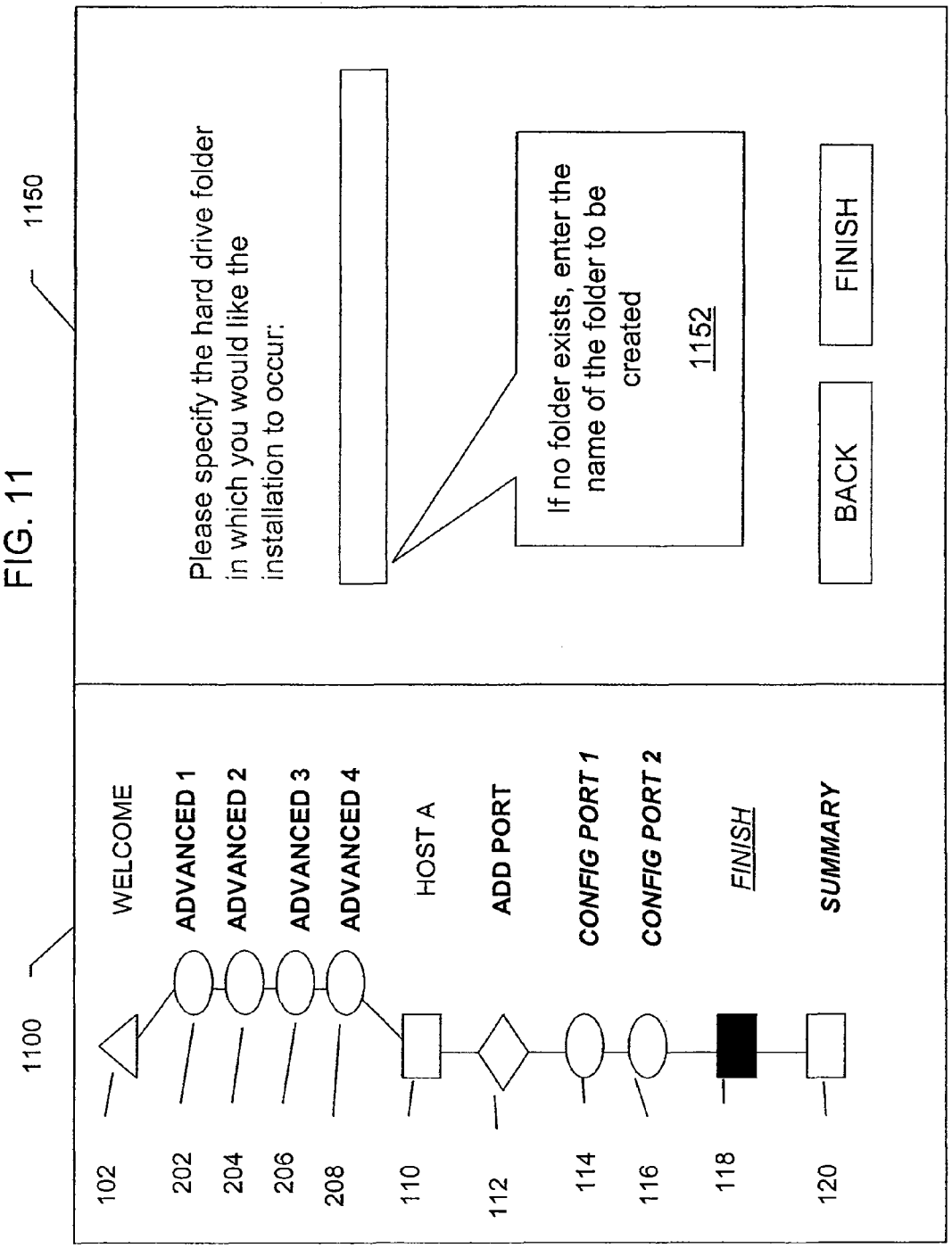
FIG. 11 illustrates a wizard screen in accordance with an embodiment of the present invention in which the user is at a disabled preview stop.
Figure 12:
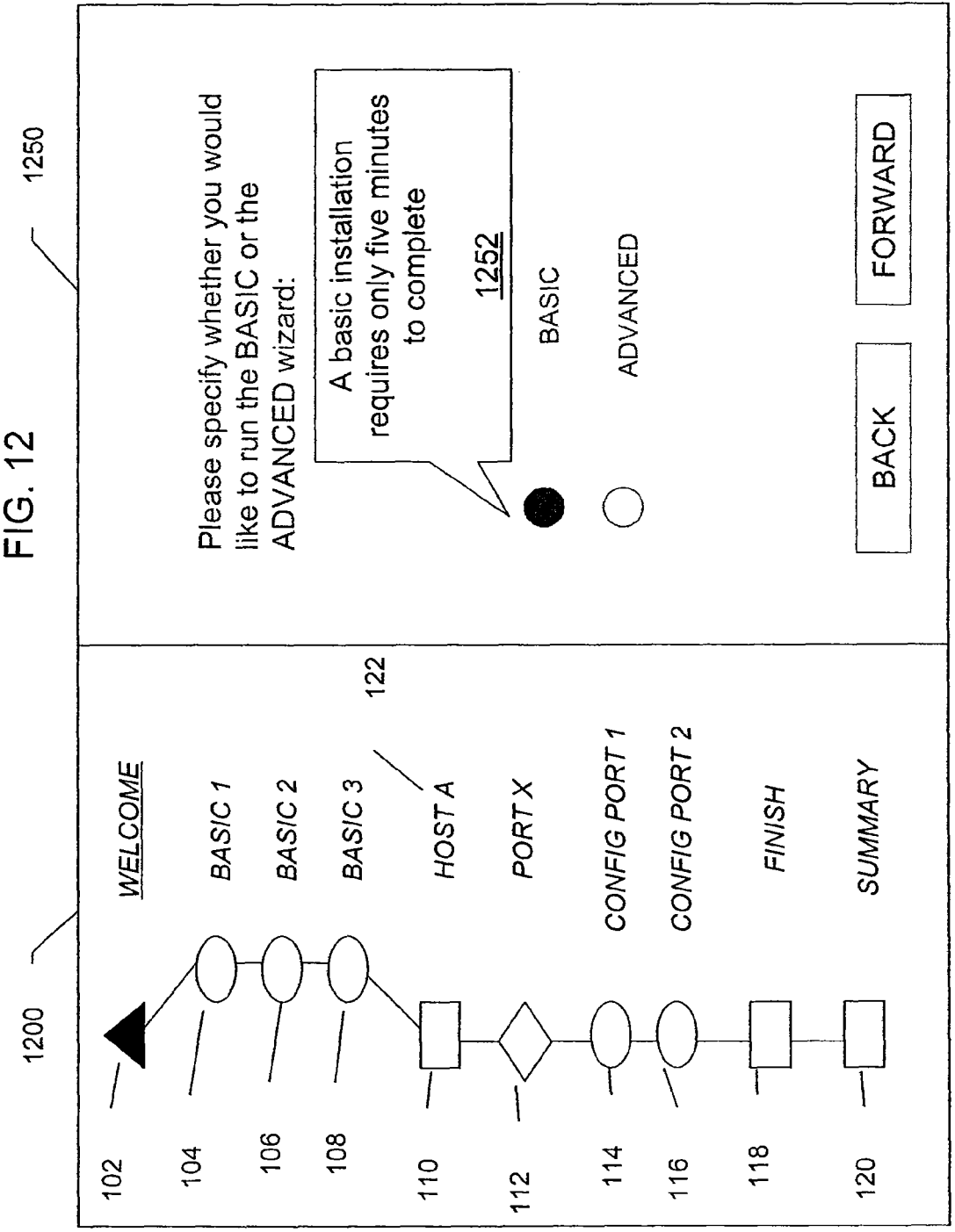
FIG. 12 illustrates a wizard screen in accordance with an embodiment of the present invention in which the user is at a disabled review stop.

The foregoing concepts are further discussed in relation to FIGS. 10-12. As previously discussed with regard to FIG. 10, the user has returned to step 102 in the roadmap and changed the selection from a basic wizard to an advanced wizard in screen 1050. Therefore, the future "FINISH" step 118 is now disabled because the user has not yet entered the required information at advanced setup stops 202/204/206/208. However, the user may still navigate to stop 118 to see a preview version of the wizard screen in which the controls may be deactivated, at least in part. As shown in FIG. 11, "FINISH" screen 1150 is visible to the user, and may be provided in gray text so as to indicate that its controls are deactivated. Explanatory text 1152 may be added to explain or give help as to the information that will be requested in this step. In another example shown in FIG. 12, the user may have already finished the installation/configuration process of the wizard. In this instance, all the steps of the roadmap may be disabled. However, the user may still navigate back through the wizard using the roadmap to review disabled versions of the wizard screens and the information that was entered. As shown in FIG. 12, the user has navigated back to the first "WELCOME" step 102, and is able to see the choice of a basic wizard made at that step. The screen 1250 may be displayed in gray to indicate that the controls of the screen are deactivated. Explanatory text 1252 may be provided to explain the information that was previously provided.

Figure 13:
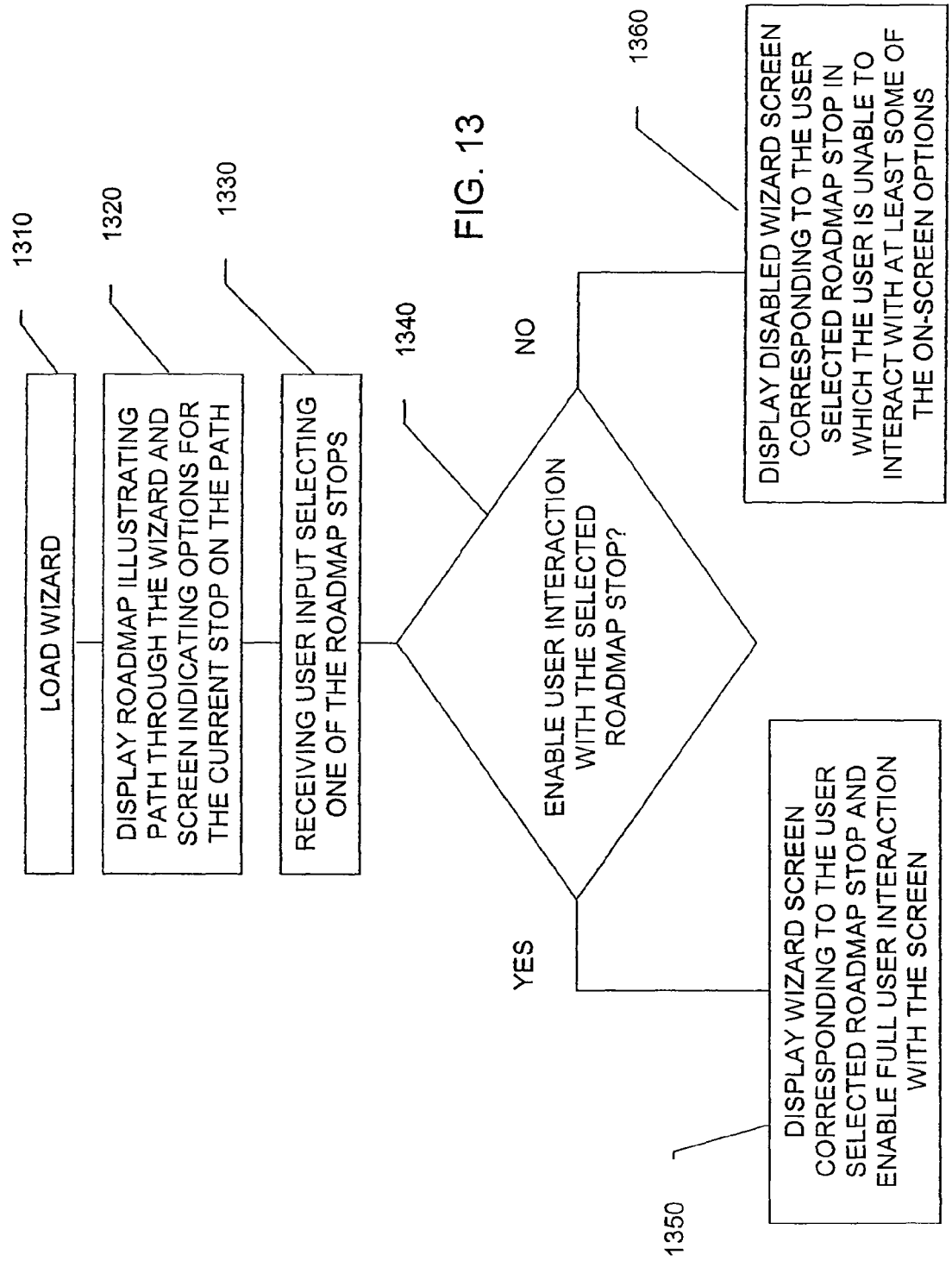
FIG. 13 is a flowchart illustrating a method in accordance with the present invention.

FIG. 13 is a flowchart illustrating one method of the present invention. At step 1310, the wizard may be loaded or initiated, for example, on the user's personal computer. At step 1320, a roadmap may be displayed illustrating the path through the wizard along with a screen indicating the options for the current roadmap stop. For example, with reference to FIG. 10, roadmap 1000 and screen 1050 may be concurrently displayed. At step 1330, the wizard may receive user input selecting one of the displayed roadmap stops, for example, stop 118 of FIG. 11. At step 1340, the wizard may determine whether to enable full user interaction with the selected roadmap stop. For example, the wizard may determine whether the user has provided the input necessary to enable interaction with the steps associated with the user selected roadmap stop. The wizard may also determine if it the user selected roadmap stop corresponds to a step in the wizard that has been completed and therefore can no longer be interacted with. If the wizard has all the necessary information, then a wizard screen corresponding to the user selected stop may be displayed at step 1350 that fully enables user interaction with the displayed options and controls. Otherwise, a disabled wizard screen corresponding to the user selected stop may be displayed at step 1360 in which at least some of the options and controls may be disabled (e.g., screen 1150 of FIG. 11).

Figure 14:
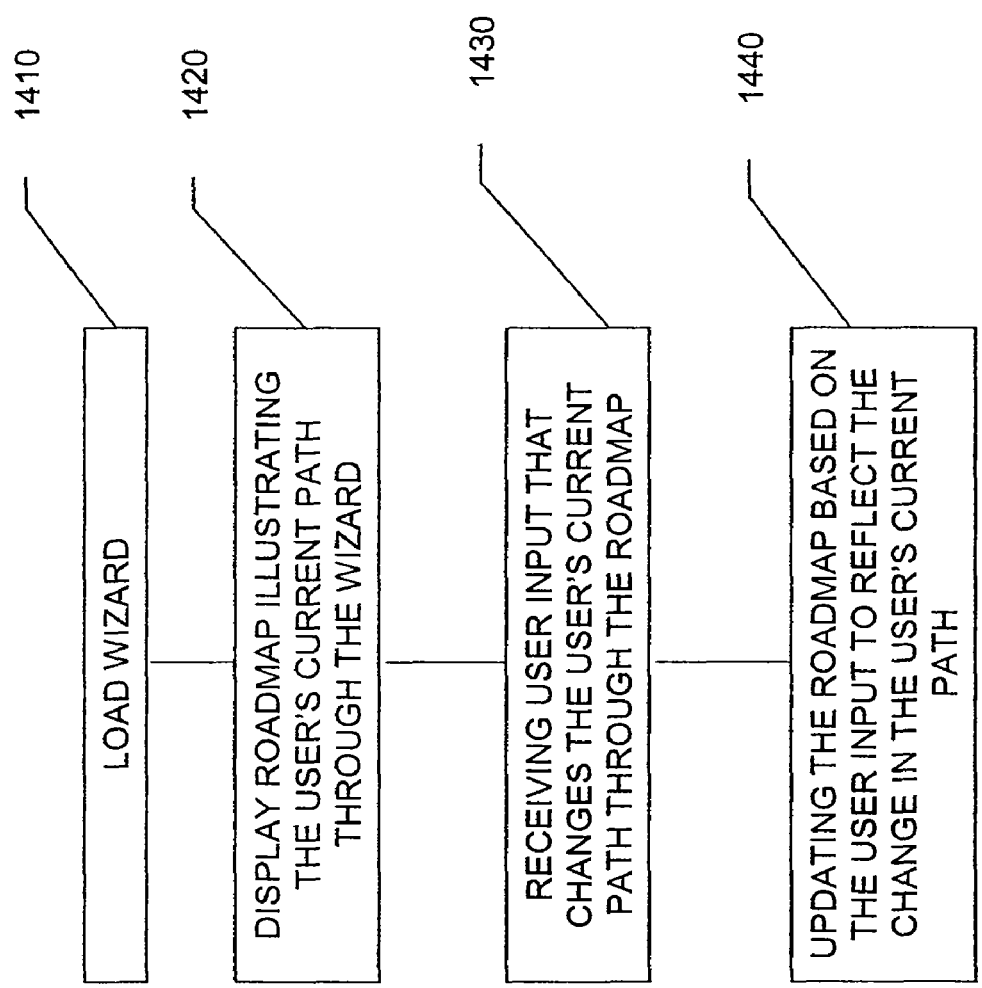
FIG. 14 is a flowchart illustrating a method in accordance with the present invention.

FIG. 14 is a flowchart illustrating another method of the present invention. At step 1410, the wizard may be loaded or initiated. A roadmap illustrating the user's current path through the wizard may be displayed at step 1420. The user's current path includes a number of roadmap stops each representing one or more steps of the wizard. The path may also include a number of branches and loops that logically represent the structure of the current path. For example, as shown in FIG. 1, roadmap 100 illustrates a path through the roadmap that includes a branch that includes the roadmap stops 104, 106, and 108. At step 1430, the wizard receives user input that changes the user's current path through the roadmap. For example, as shown in FIG. 2, the user may select an advanced wizard in screen 250, which changes the user's current path (as illustrated by roadmap 100 of FIG. 1) by changing which branch the user will travel down at branching stop 102. At step 1440, the roadmap is updated based on the user input to reflect the change in the user's current path. For example, as shown in FIG. 2, roadmap 200 reflects the change in the current path by removing the previously displayed branch and displaying the user selected branch including stops 202, 204, 206, and 208.

Figure 15:
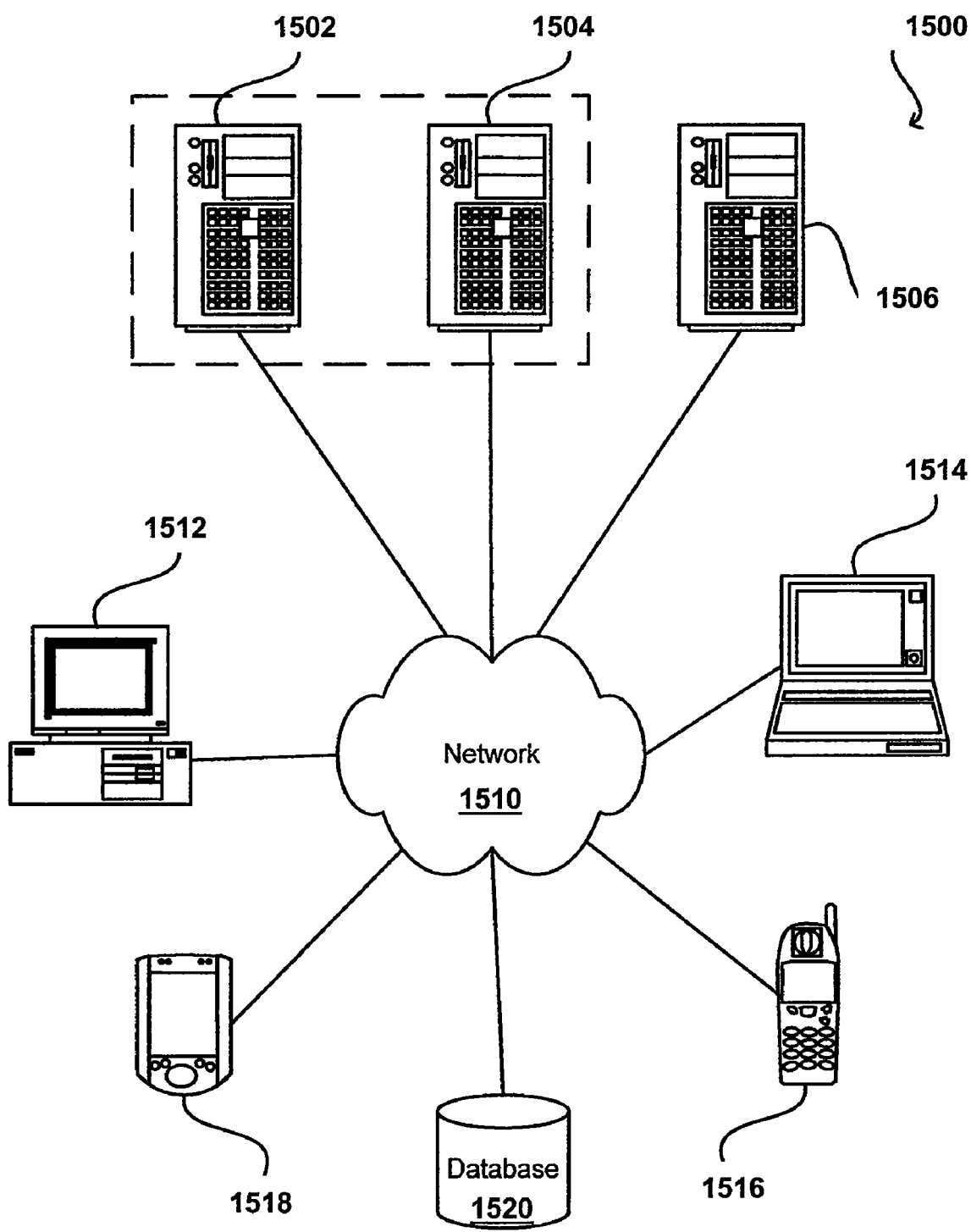
FIG. 15 illustrates components of a computer network that can be used in accordance with one embodiment of the present invention.

FIG. 15 is a block diagram illustrating components of an exemplary operating environment in which various embodiments of the present invention may be implemented. The system 1500 can include one or more user computers, computing devices, or processing devices 1512, 1514, 1516, 1518, which can be used to operate a client, such as a dedicated application, web browser, etc. The user computers 1512, 1514, 1516, 1518 can be general purpose personal computers (including, merely by way of example, personal computers and/or laptop computers running a standard operating system), cell phones or PDAs (running mobile software and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 1512, 1514, 1516, 1518 may also have any of a variety of applications, including one or more development systems, database client and/or server applications, and Web browser applications. Alternatively, the user computers 1512, 1514, 1516, 1518 may be any other electronic device, such as a thin-client computer, Internet-enabled gaming system, and/or personal messaging device, capable of communicating via a network (e.g., the network 1510 described below) and/or displaying and navigating Web pages or other types of electronic documents. Although the exemplary system 1500 is shown with four user computers, any number of user computers may be supported.

In most embodiments, the system 1500 includes some type of network 1510. The network may can be any type of network familiar to those skilled in the art that can support data communications using any of a variety of commercially-available protocols, including without limitation TCP/IP, SNA, IPX, AppleTalk, and the like. Merely by way of example, the network 1510 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, GRPS, GSM, UMTS, EDGE, 2G, 2.5G, 3G, 4G, Wimax, WiFi, CDMA 2000, WCDMA, the Bluetooth protocol known in the art, and/or any other wireless protocol); and/or any combination of these and/or other networks.

The system may also include one or more server computers 1502, 1504, 1506 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 1506) may be dedicated to running applications, such as a business application, a Web server, application server, etc. Such servers may be used to process requests from user computers 1512, 1514, 1516, 1518. The applications can also include any number of applications for controlling access to resources of the servers 1502, 1504, 1506.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 1512, 1514, 1516, 1518. As one example, a server may execute one or more Web applications. The Web application may be implemented as one or more scripts or programs written in any programming language, such as Java®, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 1512, 1514, 1516, 1518.

The system 1500 may also include one or more databases 1520. The database(s) 1520 may reside in a variety of locations. By way of example, a database 1520 may reside on a storage medium local to (and/or resident in) one or more of the computers 1502, 1504, 1506, 1512, 1514, 1516, 1518. Alternatively, it may be remote from any or all of the computers 1502, 1504, 1506, 1512, 1514, 1516, 1518, and/or in communication (e.g., via the network 1510) with one or more of these. In a particular set of embodiments, the database 1520 may reside in a storage-area network ("SAN") familiar to those skilled in the art. Similarly, any necessary files for performing the functions attributed to the computers 1502, 1504, 1506, 1512, 1514, 1516, 1518 may be stored locally on the respective computer and/or remotely, as appropriate. In one set of embodiments, the database 1520 may be a relational database, such as Oracle 10g, that is adapted to store, update, and retrieve data in response to SQL-formatted commands.

Figure 16:
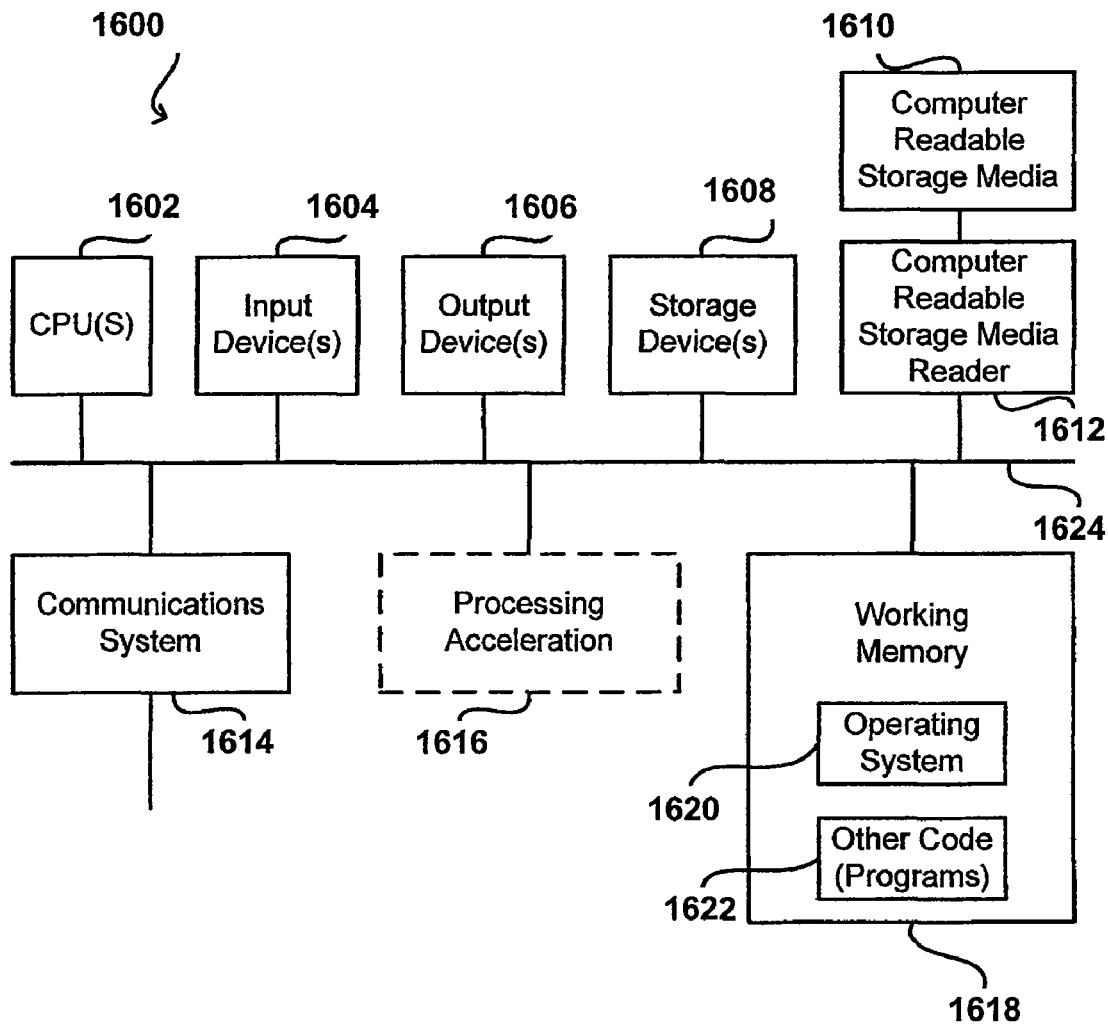
FIG. 16 illustrates components of a computerized device that can be used in accordance with one embodiment of the present invention.

FIG. 16 illustrates an exemplary computer system 1600, in which various embodiments of the present invention may be implemented. The system 1600 may be used to implement any of the computer systems described above. The computer system 1600 is shown comprising hardware elements that may be electrically coupled via a bus 1624. The hardware elements may include one or more central processing units (CPUs) 1602, one or more input devices 1604 (e.g., a mouse, a keyboard, etc.), and one or more output devices 1606 (e.g., a display device, a printer, etc.). The computer system 1600 may also include one or more storage devices 1608. By way of example, the storage device(s) 1608 can include devices such as disk drives, optical storage devices, solid-state storage device such as a random access memory ("RAM") and/or a read-only memory ("ROM"), which can be programmable, flash-updateable and/or the like.

The computer system 1600 may additionally include a computer-readable storage media reader 1612, a communications system 1614 (e.g., a modem, a network card (wireless or wired), an infra-red communication device, etc.), and working memory 1618, which may include RAM and ROM devices as described above. In some embodiments, the computer system 1600 may also include a processing acceleration unit 1616, which can include a digital signal processor DSP, a special-purpose processor, and/or the like.

The computer-readable storage media reader 1612 can further be connected to a computer-readable storage medium 1610, together (and, optionally, in combination with storage device(s) 1608) comprehensively representing remote, local, fixed, and/or removable storage devices plus storage media for temporarily and/or more permanently containing, storing, transmitting, and retrieving computer-readable information. The communications system 1614 may permit data to be exchanged with the network and/or any other computer described above with respect to the system 1600.

The computer system 1600 may also comprise software elements, shown as being currently located within a working memory 1618, including an operating system 1620 and/or other code 1622, such as an application program (which may be a client application, Web browser, mid-tier application, RDBMS, etc.). It should be appreciated that alternate embodiments of a computer system 1600 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for enabling user navigation through a wizard comprising a plurality of wizard screens, the method comprising:

displaying a first wizard screen of the plurality of wizard screens;

displaying, concurrently with the first wizard screen, a roadmap comprising a plurality of roadmap stops each associated with a corresponding one of the plurality of wizard screens, such that a user can non-linearly navigate to any corresponding one of the plurality of wizard screens by interacting with its associated roadmap stop, wherein at least one of the roadmap stops indicates a current user position in the wizard and at least one of the roadmap stops is identified in the roadmap as a disabled roadmap stop;

enabling selection of the at least one of the roadmap stops identified in the roadmap as the disabled roadmap stop; and in response to the user selecting the disabled roadmap stop, displaying a second wizard screen concurrently with the roadmap, the second wizard screen corresponding to the disabled roadmap stop, wherein at least some user controls of the second wizard screen are deactivated.

2. The method of claim 1, further comprising displaying explanatory text on the second wizard screen corresponding to the disabled stop.

3. The method of claim 1, wherein the disabled stop is subsequent in the roadmap to a stop at which the user is queried for information required to enable the disabled stop.

4. The method of claim 1, wherein the disabled stop is prior in the roadmap to a stop at which a task of the wizard is completed.

5. The method of claim 1, wherein the plurality of roadmap stops comprises at least one of a branching stop and a looping stop.

6. The method of claim 5, further comprising indicating in the roadmap at least one branch or loop of the roadmap.

7. The method of claim 1, wherein the roadmap indicates a current user position in the wizard by indicating a current roadmap stop.

8. The method of claim 7, wherein indicating a current roadmap stop comprises altering a graphical or textual appearance of the current roadmap stop.

9. The method of claim 1, further comprising updating the roadmap based on the user input in the wizard.

10. The method of claim 9, wherein updating the roadmap comprises indicating in the roadmap whether roadmap stops are enabled for user interaction.

11. A method for enabling user navigation through a wizard comprising a plurality of wizard screens, the method comprising:

displaying a wizard screen of the plurality of wizard screens;

displaying, concurrently with the wizard screen, a roadmap comprising a plurality of roadmap stops each associated with a corresponding one of the plurality of wizard screens, such that a user can non-linearly navigate to any corresponding one of the plurality of wizard screens by interacting with its associated roadmap stop, the displaying of the roadmap indicating that one of the roadmap stops is followed by a first set of roadmap stops;

receiving user input to alter a user control on the displayed wizard screen; and updating displaying of the roadmap based on the user input to indicate that the one of the roadmap stops is followed by a second set of roadmap stops, the second set of roadmap stops being different from the first set of roadmap stops.

12. The method of claim 11, wherein:

the roadmap includes at least one branching stop indicating a branch in navigation through the wizard; and receiving user input comprises receiving user input at the branching stop.

13. The method of claim 12, wherein updating displaying of the roadmap comprises displaying a different branch of the roadmap based on the user input.

14. The method of claim 11, wherein:

the roadmap includes at least one looping stop indicating a loop in navigation through the wizard; and receiving user input comprises receiving user input at the looping stop.

15. The method of claim 14, wherein updating displaying of the roadmap comprises displaying a new loop of the roadmap or removing a previously displayed loop of the roadmap based on the user input.

16. The method of claim 11, wherein updating displaying of the roadmap comprises displaying a new roadmap stop or removing a previously displayed roadmap stop based on the user input.

17. The method of claim 11, wherein updating displaying of the roadmap comprises revising a title associated with a roadmap stop.

18. The method of claim 11, further comprising updating the roadmap to indicate whether roadmap stops have been visited by the user.

19. The method of claim 11, further comprising updating the roadmap to indicate whether roadmap stops are enabled for user interaction.

20. The method of claim 11, further comprising altering graphical or textual appearances of the roadmap stops.

21. The method of claim 11, further comprising indicating in the roadmap a location of a branching stop or a looping stop.

22. A computer readable medium having sets of instructions stored thereon which, when executed by a computer, cause the computer to perform the following method:

displaying a first wizard screen of a plurality of wizard screens of a wizard;

displaying, concurrently with the first wizard screen, a roadmap comprising a plurality of roadmap stops each associated with a corresponding one of the plurality of wizard screens, such that a user can non-linearly navigate to any corresponding one of the plurality of wizard screens by interacting with its associated roadmap stop, wherein at least one of the roadmap stops indicates a current user position in the wizard and at least one of the roadmap stops is identified in the roadmap as a disabled roadmap stop;

enabling selection of the at least one of the roadmap stops identified in the roadmap as the disabled roadmap stop; and in response to the user selecting the disabled roadmap stop, displaying a second wizard screen concurrently with the roadmap, the second wizard screen corresponding to the disabled roadmap stop, wherein at least some user controls of the second wizard screen are deactivated.

23. A computer readable medium having sets of instructions stored thereon which, when executed by a computer, cause the computer to perform the following method:

displaying a wizard screen of a plurality of wizard screens of a wizard;

displaying, concurrently with the wizard screen, a roadmap comprising a plurality of roadmap stops each associated with a corresponding one of the plurality of wizard screens, such that a user can non-linearly navigate to any corresponding one of the plurality of wizard screens by interacting with its associated roadmap stop, the displaying of the roadmap indicating that one of the roadmap stops is followed by a first set of roadmap stops;

receiving user input to alter a user control on the displayed wizard screen; and updating displaying of the roadmap based on the user input to indicate that the one of the roadmap stops is followed by a second set of roadmap stops, the second set of roadmap stops being different from the first set of roadmap stops.

* * * * *

UNITED STATES PATENT AND TRADEMARK OFFICE
CERTIFICATE OF CORRECTION

| | | |
|---|---|---|
| PATENT NO. | : 7,895,526 B2 | Page 1 of 1 |
| APPLICATION NO. | : 11/696055 | |
| DATED | : February 22, 2011 | |
| INVENTOR(S) | : Evans | |

It is certified that error appears in the above-identified patent and that said Letters Patent is hereby corrected as shown below:

In column 1, line 31, after "that" delete "that". (Second Occurrence)

Signed and Sealed this
Fourth Day of October, 2011

David J. Kappos
*Director of the United States Patent and Trademark Office*